United States Patent
Agrawal et al.

(10) Patent No.: US 8,444,725 B2
(45) Date of Patent: May 21, 2013

(54) SYSTEM AND PROCESS FOR PRODUCING SYNTHETIC LIQUID HYDROCARBON

(75) Inventors: Rakesh Agrawal, West Lafayette, IN (US); Navneet R. Singh, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 970 days.

(21) Appl. No.: 11/853,484

(22) Filed: Sep. 11, 2007

(65) Prior Publication Data

US 2008/0115415 A1  May 22, 2008

Related U.S. Application Data

(60) Provisional application No. 60/843,678, filed on Sep. 11, 2006.

(51) Int. Cl.
*C10J 3/00* (2006.01)
*C01B 3/36* (2006.01)
*C01B 6/24* (2006.01)
*B09B 1/00* (2006.01)

(52) U.S. Cl.
USPC ............ 48/210; 48/197 R; 48/202; 48/197 A; 423/644

(58) Field of Classification Search
USPC ....... 48/61, 197 R, 210, 197 A, 202; 423/644
See application file for complete search history.

(56) References Cited

U.S. PATENT DOCUMENTS

| | | | | |
|---|---|---|---|---|
| 4,279,830 | A * | 7/1981 | Haag et al. ................. | 518/700 |
| 5,344,848 | A * | 9/1994 | Steinberg et al. ............ | 518/704 |
| 6,645,442 | B2 | 11/2003 | Kaneko et al. | |
| 7,456,226 | B2 * | 11/2008 | Topf et al. ................... | 518/705 |
| 7,575,613 | B2 * | 8/2009 | Hobbs ........................ | 48/197 R |
| 2005/0032920 | A1 * | 2/2005 | Norbeck et al. ............. | 518/704 |

FOREIGN PATENT DOCUMENTS

| | | |
|---|---|---|
| EP | 347765 A1 * | 12/1989 |
| GB | 1 475 092 | 6/1977 |
| GB | 2073869 A | 10/1981 |
| WO | WO 2004/037717 A1 | 5/2004 |
| WO | WO 2005/056737 A1 | 6/2005 |

OTHER PUBLICATIONS

Machine Translation of EP 347765 A1 with English language abstract (Jan. 11, 2011).*

"American Energy Security: Building a Bridge to Energy Independence and to a Sustainable Energy Future," The Southern States Energy Board, Norcross, Georgia, Jul. 2006, pp. 1-211 (including beginning title page and pp. i-xxxvi).

(Continued)

*Primary Examiner* — Matthew Merkling
(74) *Attorney, Agent, or Firm* — D'Hue Law LLC; Cedric A. D'Hue

(57) ABSTRACT

Production of synthetic liquid hydrocarbon fuel from carbon containing moieties such as biomass, coal, methane, naphtha as a carbon source and hydrogen from a carbon-free energy source is disclosed. The biomass can be fed to a gasifier along with hydrogen, oxygen, steam and recycled carbon dioxide. The synthesis gas from the gasifier exhaust is sent to a liquid hydrocarbon conversion reactor to form liquid hydrocarbon molecules. Unreacted CO & $H_2$ can be recycled to the gasifier along with $CO_2$ from the liquid hydrocarbon conversion reactor system. Hydrogen can be obtained from electrolysis of water, thermo-chemical cycles or directly by using energy from carbon-free energy sources.

29 Claims, 7 Drawing Sheets

Liquid Hydrocarbon Synthesis wherein carbonaceous by-products and $CO_2$ from fermenter are fed to gasifier

OTHER PUBLICATIONS

Oyvind Vessia et al., entitled "Biofuels from lignocellulosic material—In the Norwegian context 2010—Technology, Potential and Costs," Dec. 20, 2005, pp. 1-101.

Hoffert, M. I. et al. Energy implications of future stabilization of atmospheric C02 content. Nature 395,881-884 (1998).

Agrawal, R., Offutt, M. & Ramage, M. P. Hydrogen economy—An opportunity for chemical engineers? AIChE Journal 51, 1582-1589 (2005).

Maclean, H. I. & Iave, L. B. Evaluating automobile fuel/propulsion system technologies Progress in Energy and Combustion Science 29, 1-69 (2003).

Schlapbach, L. & Zuttel, A. Hydrogen-storage materials for mobile applications. Nature 414, 353-358 (2001).

The NRC report. The Hydrogen Economy-Opportunites, Costs, Barriers, and R&D Needs 2004 (The National Academies Press, Washington DC).

Tarascon, J. M. & Armand, M. Issues and challenges facing rechargeable lithium batteries. Nature 414, 359-367 (2001).

Hill, J., Nelson, E., Tilman, D., Polasky, S. & Tiffany, D. From the Cover: Environmental, economic, and energetic costs and benefits of biodiesel and ethanol biofuels. PNAS 103, 11206-11210 (2006).

A P Steynberg & Dry, M. E. (eds.) Fischer Tropsch Technology (Elsevier, 2004).

Riedel, T. et at. Comparative study of Fischer-Tropsch synthesis with $H_2/CO$ and $H_2/CO_2$ syngas using Fe- and Co-based catalysts. Applied Catalysis A: General 186, 201-213 (1999).

Bridgwater, A. V. Renewable fuels and chemicals by thermal processing of biomass. Chemical Engineering Journal 91,87-102 (2003).

Li, X., Grace, J. R., Watkinson, A. P., Lim, C. J. & Ergudenler, A. Equilibrium modeling of gasification: a free energy minimization approach and its application to a circulating fluidized bed coal gasifier. Fuel 80, 195-207 (2001).

Yuehong, Z., Hao, W. & Zhihong, X. Conceptual design and simulation study of a co-gasification technology. Energy Conversion and Management 47, 1416-1428 (2006).

Agrawal, R., Singh, N. R., Ribeiro, F. H. & Delgass, W. N. Sustainable fuel for the transportation sector. PNAS 104, 4828-4833 (2007).

Graham, R. L., Nelson, R., Sheehan, J., Perlack, R. D. & Wright, L. L. Current and Potential U.S. Corn Stover Supplies. Agron J 99, 1-11 (2007).

Farrell, A. E. et al. Ethanol Can Contribute to Energy and Environmental Goals. Science 311, 506-508 (2006).

U S Carbon Dioxide Emissions from Energy Sources 2005 Flash Estimate. (2006).

Pacala, S. & Socolow, R. Stabilization wedges: Solving the climate problem for the next 50 years with current technologies. Science 305, 968-972 (2004).

Verkerk, K. A. N., Jaeger, B., Finkeldei, C.-H. & Keirn, W. Recent developments in isobutanol synthesis from synthesis gas. Applied Catalysis A: General 186, 407-431 (1999).

International Search Report—PCT/US2007/078126 (Jul. 17, 2008).

Nathan S. Lewis et al., entitled "Powering the plant: Chemical challenges in solar energy utilization," http://www.pnas.org/cgi/doi/10.1073/pnas.0603395103, vol. 103, No. 43, Oct. 24, 2006, pp. 15729-15736.

Ulf Bossel et al., entitled "The Future of the Hydrogen Economy: Bright or Bleak?" European Fuel Cell Forum, http://www.efcf.com/reports, Feb. 26, 2005, pp. 1-39.

U.S. Department of Energy, entitled "Just the Basics Diesel Engine Freedom CAR & Vehicle Technologies Program," http://www.eere.energy.gov/vehiclesandfuels, Aug. 2003, pp. 1-2.

P.L. Spath et al., entitled "Preliminary Screening—Technical and Economic Assessment of Synthesis Gas to Fuels and Chemicals with Emphasis on the Potential for Biomass-Derived Syngas," Report No. NREL/TP-510-34929, National Renewable Energy Laboratory, Golden, CO, http://www.nrel.gov/docs/fy04osti/34929.pdf, Dec. 2003, pp. 1-143 (including beginning titles pages and i-xiv).

Kurt A. Rosentrater, entitled "Expanding the Role of Systems Modeling: Considering Byproduct Generation from Biofuel Production," http://www.ecologyandsociety.org/vol11/iss1/resp2/, Ecology and Society, 2005, pp. 1-12.

* cited by examiner

PRIOR ART
Conventional Liquid Hydrocarbon Process

Liquid Hydrocarbon Synthesis using Carbon-free energy source

Liquid Hydrocarbon Synthesis using Carbon-free energy source and CO$_2$ recycle

Liquid Hydrocarbon Synthesis with a separate reverse Water Gas Shift reactor is used Liquid Hydrocarbon Synthesis wherein carbonaceous by-products and CO₂ from fermenter are fed to gasifier

SYSTEM AND PROCESS FOR PRODUCING SYNTHETIC LIQUID HYDROCARBON

CROSS-REFERENCE TO RELATED APPLICATIONS

This application claims the benefit of U.S. Provisional Application Ser. No. 60/843,678, filed on Sep. 11, 2006, entitled "PROCESS FOR PRODUCING SYNTHETIC LIQUID HYDROCARBON," the entire contents of which are incorporated herein by reference.

FIELD OF THE INVENTION

The present invention relates generally to the synthesis of liquid hydrocarbon, and, in particular, to the synthesis of liquid hydrocarbon by reacting biomass with a carbon-free energy source.

BACKGROUND OF THE INVENTION

For the past 150 years, human society relied on fossil fuels initially for illumination purposes and later for automobile fuels and generation of electricity. However, usage of fossil fuels releases carbon dioxide to the atmosphere. Industrialization has raised the earth's atmospheric $CO_2$ concentration from the pre-industrial level of 280 ppm to the current value of about 375 ppm. The 'business as usual' scenario, with no intervention, is expected to raise the $CO_2$ concentration to about 750 ppm by the middle of this century. According to Hoffert et al., stabilization of atmospheric $CO_2$ concentration at twice the pre-industrial concentration level will require 10 TW of additional carbon-emission-free power by 2050. Worldwide primary energy consumption in 2001 was 13.5 TW (1 TW=$10^{12}$ watts) which is expected to increase to 27.6 TW by 2050. Best way to decrease the atmospheric $CO_2$ concentration will be to reduce emission of $CO_2$ to the atmosphere.

One energy sector where reduction of $CO_2$ release is proving to be difficult is the transportation sector. Automobiles, trucks, planes etc. use gasoline and diesel as sources of energy. These liquid fuels are used due to their high energy density and ease of use. However, their combustion leads to release of massive quantities of $CO_2$ and for this sector, $CO_2$ capture is not viable. Therefore, alternate energy carriers like $H_2$ and battery powered vehicles have been proposed. However, there are challenges associated with the use of $H_2$ and battery powered vehicles.

Conventional $H_2$ storage as compressed or liquefied hydrogen, hydrogen adsorption on large surface area, and hydrogen storage by metal hydrides have been proposed, but none of these strategies can currently meet the 8 wt % target for storing hydrogen required by the transportation sector. As a result, one major challenge in the use of $H_2$ for the transportation sector is its storage, transportation and delivery.

Rechargeable Battery powered vehicles is another option proposed to reduce greenhouse gas emissions. A major challenge involved with batteries is that storage density of most commercial batteries is in the range of 75 to 150 Whr/kg, which is only sufficient for a short distance driving.

It is clear that liquid hydrocarbons are needed to fulfill the need for long distance driving and for aviation purposes because of the ease of handling and storage. However, most predictions suggest that conventional oil production will peak by 2025. It has been suggested to use biomass for the production of liquid fuels. This can also provide a solution to the problem of $CO_2$ emission for transportation sector. This process is essentially $CO_2$ neutral because $CO_2$ released from vehicle exhaust will be captured from the atmosphere during biomass growth.

There are currently two major processes for conversion of biomass to liquid fuels. In the first process, fermentation of easily fermentable plant products such as sugar, sucrose, dextrose, xylose, etc. to alcohols is achieved. These easily fermentable plant products can be extracted from corn, sugar cane etc. Some of the alcohols thus produced that can be used as fuel are methanol, ethanol, butanols etc. Carbon dioxide is also liberated as a byproduct during the fermentation process. The major disadvantage of this pathway is that only a fraction of the total biomass is converted to the final desired liquid hydrocarbon fuels. As a result, such processes have extreme difficulty in meeting the large demands of the transportation sector. It has been estimated that only 12% of the total gasoline and 6% of the diesel demand can be fulfilled from all corn and soybean conversion to ethanol and biodiesel respectively in U.S. On the other hand, the second major process involves gasification and is capable of using whole biomass as feedstock for reaction instead of only a small fraction, as in the case of fermentation. This pathway involves gasification of biomass to obtain synthesis gas (syngas), a mixture of CO & $H_2$ in any combination and conversion of this synthesis gas to liquid fuels using Fischer-Tropsch (FT) process. A quick estimate can be made for the required land area to support total current oil consumption of 13.84 million barrels per day by the U.S. transportation sector. For this purpose, the numbers for the amount of syngas production from biomass gasification provided in the recent National Research Council's report on $H_2$ can be used. If one assumes the conversion of syngas to diesel to be 100% efficient then the land area requirement for the current biomass growth rate and gasification efficiency is estimated to be about 5,296,000 square km. This required land area is 58% of the total U.S. land area. To put the numbers in perspective, the currently used cropland area in the U.S. is 1,395,000 square km, which is roughly 20% of U.S. land area. Clearly, this is not a feasible solution.

A schematic of a typical biomass based gasifier process is shown in FIG. 1. Water content of biomass such as switch grass, corn, wood and other cellulosic mass is relatively high. Therefore, the biomass generally needs to be pre-dried prior to feeding it in a gasifier. Such a drying process can easily consume 10-20% of the total biomass as an energy source to supply heat for drying rest of the biomass. The dried biomass is then gasified to a mixture of CO, $CO_2$, $H_2$ and $H_2O$ (also known as synthesis gas) using oxygen and steam at temperature generally around 500-1500° C. and pressures of 1-100 bar. The ratio of $H_2$ and CO in the synthesis gas is important and depends on the end use. $H_2$/CO ratio should be $(2n+1)/n$ for alkanes containing n carbon atoms per molecule and 2 for alkenes and alcohols. In a typical gasifier, oxygen is supplied to combust a portion of the feed stock. The resulting combustion energy not only supplies the energy losses from the system but the majority of it is stored in CO and $H_2$ exiting the gasifier. The efficiency of a biomass gasifier is 50 to 70%, meaning that the thermal energy content of the gas exiting the gasifier is 50% to 70% of the thermal energy content of the biomass fed to the gasifier. Depending on the temperature and efficiency of the gasifier, $CO_2$ concentration can vary from 6 to 29 mol % on a dry basis. The subsequent water-gas shift reaction adjusts the $H_2$/CO ratio to about two, which is needed for the formation of straight chain hydrocarbons in a Fischer-Tropsch reactor. This leads to the formation of additional $CO_2$ due to the Water Gas Shift reaction (WGS).

$$CO+H_2O=CO_2+H_2 \Delta H_{0° C.}=-41.203 \text{ kJ/mol}$$

$$\Delta H_{1000° C.}=-32.196 \text{ kJ/mol}$$

Using this reaction, CO concentration can be decreased and $H_2$ can be increased to achieve the desired ratio. From the Fischer-Tropsch reactor, we get a distribution of products ranging from C1 to C100. Smaller, gaseous molecules can be burned to generate power and higher molecules are hydrocracked to give diesel range molecules. However, the thermal efficiency of an actual biomass to synthetic hydrocarbon liquids using gasification and Fischer-Tropsch (FT) process is only about 35%. The carbon conversion efficiency of biomass to hydrocarbon liquid is also low. Depending on the overall efficiency of the process, nearly one third of carbon contained in the original biomass show up in the diesel molecules. Rest of the carbon in biomass is emitted back to the atmosphere as $CO_2$. This disadvantage applies to biomass to methanol process as well as for any other biomass to liquid processes because gasification and WGS reaction is involved to obtain the required $H_2/CO$ ratio.

An advantage of using a gasifier operating at high temperatures and pressures for the production of liquid fuels instead of direct biomass liquefaction, biomass pyrolysis or any other such configurations are as follows: removal of pollutants from the gaseous stream at the exhaust of the gasifier is easy, gasification brings different forms of biomass to a common denomination (CO & $H_2$) to obtain uniform fuel through liquid hydrocarbon conversion reactor. In contrast, the direct biomass liquefaction will give alcohols, aromatics, alkanes, alkenes or any combination of these compounds and separation processes to obtain them in desirable form are much more complicated. One of the major disadvantages of direct biomass liquefaction and biomass pyrolysis is that all the pollutants present in the biomass shows up in the product mixture and separation will be very difficult. Also, aromatics are formed in these processes. This presents challenge as the norms for sulfur and aromatics contents in liquid fuels are becoming more stringent. Furthermore, the composition of the reactor effluent will depend on the type of biomass used.

The unique advantage of FT diesel produced is that in addition to being high energy density liquid fuel which can be easily transported, it has low vapor pressure so there is no need to pressurize the storage tanks. This means that it can be transported at atmospheric pressure in normal tankers with very little loss during storage and transportation, unlike methanol. Synthetic diesel so produced is not soluble in water and it is biodegradable so that in case of any spillage during transportation, it can be degraded by micro-organisms. Other major advantage is that it is compatible with existing engines and fuel infrastructure. Also, diesel engines are 50% more efficient than gasoline engines.

As in the case of any chemical process, only a fraction of synthesis gas fed to the FT reactor reacts to form desired products and the unreacted synthesis gas is recycled back to the FT reactor after the separation of $CO_2$. There has been an attempt in the past to recycle $CO_2$ to the Fischer-Tropsch reactor and convert it to CO using the reverse Water Gas Shift reaction, but the conversion is limited by the thermodynamics of the reaction and the relatively fast nature of the CO hydrogenation reaction. $H_2$ in the Fischer-Tropsch reactor is almost exclusively consumed by CO rather than $CO_2$.

BRIEF SUMMARY OF THE INVENTION

Although several methods have been reported on the synthesis of liquid hydrocarbon fuels from biomass as mentioned above, none of the routes can come up with manageable land area requirements. It is desirable to have a process whereby land area requirement is significantly reduced. One aspect of the present invention to achieve this goal. Examples of the present invention provide a method or process that converts a larger fraction of the carbon in the biomass to liquid hydrocarbon fuels. By achieving this goal of high carbon efficiency, examples of the present invention reduce the land area required to grow the biomass to produce a given quantity of the liquid hydrocarbon fuel.

In one example, the present invention provides a process for the conversion of biomass as a carbon containing moiety to liquid hydrocarbon fuel. The process comprises gasifying at least a portion of the carbon containing moiety by a predetermined energy source to produce a syngas stream containing carbon monoxide and hydrogen. At least a portion of the predetermined energy source for gasifying being from a carbon-free energy source. The process further comprises reacting the syngas stream to form liquid hydrocarbon fuel.

In another example, the present invention provides a system for the conversion of coal as a carbon containing moiety to liquid hydrocarbon fuel. The system comprises a gasification unit receiving energy to gasify at least a portion of the carbon containing moiety to produce a syngas stream containing carbon monoxide and hydrogen. At least a portion of the energy for gasifying being from a carbon-free energy source. The system further comprises a hydrocarbon conversion reactor system for reacting the syngas stream to form liquid hydrocarbon fuel. The hydrocarbon conversion reactor system is in fluid communication with the gasification unit.

Further objects, features, and advantages of the present invention will become apparent from consideration of the following description and the appended claims when taken in connection with the accompanying drawings.

BRIEF DESCRIPTION OF THE DRAWINGS

Corresponding reference characters indicate corresponding parts throughout the several views.

DETAILED DESCRIPTION OF THE INVENTION

The examples of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

Examples of the present invention details a processes for the synthesis of liquid hydrocarbons whereby energy from a carbon-free energy source is used in the conversion process of biomass to liquid fuels. A biomass is a carbon containing plant or tree material that grows in the earth's ecosystem. For the purpose of this invention, any plant or tree material can be used. Some examples include switch grass, poplar tree, sugar cane, corn, tree barks, etc. Examples of carbon-free energy sources include solar, wind, hydro, nuclear etc. while solar, wind and hydro are examples of renewable energy sources; nuclear energy is a non-renewable carbon-free energy source. The energy to be used from a carbon-free energy source can be collected as high temperature heat (thermal energy), electricity or hydrogen. Of these three, $H_2$ is preferred. Sources such as wind and hydro can easily provide electricity. This electricity can then be either converted to $H_2$ through electrolysis of water or used to provide high temperature heat. Other sources such as solar and nuclear have the additional option of providing high temperature heat directly or $H_2$ through a suitable thermo-chemical cycle that directly uses high temperature heat. Some examples of thermo-chemical cycles are sulfur-iodine (SI) and calcium-bromine-iron cycles. There are advancements being made in which solar energy can be directly used to recover $H_2$ from water.

The process of present disclosure pertains to a scenario where at least a portion of the biomass is gasified to a gaseous stream called synthesis gas or "syngas." The syngas contains at least a mixture of carbon monoxide (CO) and hydrogen ($H_2$). The ratio of CO to $H_2$ in the syngas varies depending on the processing steps during the gasification process. The process of gasification typically includes a gasifier and the post processing steps prior to the liquid hydrocarbon conversion reactor. After all the steps in the gasification process, the syngas is sent to a suitable reactor for synthesis of liquid hydrocarbons. The liquid hydrocarbons of most interest are the ones that can be used by the transportation sector such as cars, trucks, airplanes etc. Such liquid fuel mixtures generally have vapor pressure less than about 1 atm at about 20° C. This allows storing such liquids in a container (tank) at near ambient pressures.

Figure 1:
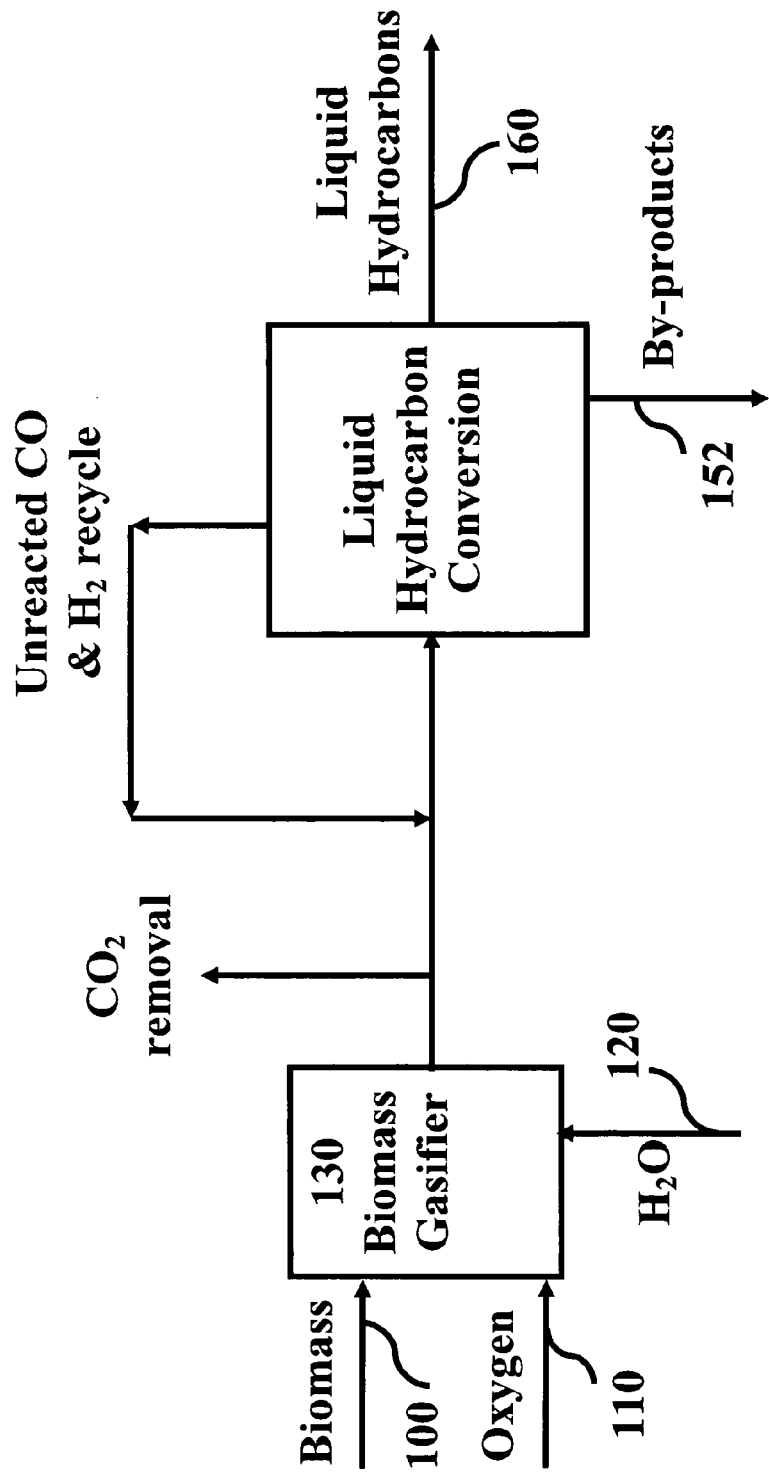
FIG. 1 is a prior art schematic diagram of current processes.

A biomass gasifier 130 is an apparatus to which biomass 100 is fed along with steam 120 and oxygen 110 as shown in FIG. 1. The following sequence of steps typically occurs in the gasifier: (1) drying of biomass to evaporate moisture; (2) pyrolysis to give gas, vaporized tars or oils and a solid char residue; and (3) partial oxidation of solids, chars and gases. To supply endothermic heat of reaction for partial oxidation of biomass, additional biomass is burned which shows up as $CO_2$. The quantity of oxygen added in the feed supplies the heat requirement for the endothermic gasification reaction of biomass as well as takes care of the inefficiencies of the gasifier. Biomass gasifiers usually operate at temperatures between about 500 and 1500° C. and at pressures varying from about 1 to 100 bar. This high temperature operation of gasifiers eliminates kinetic barriers, and the gaseous stream leaving the gasifier is nearly at thermodynamic equilibrium.

Depending on the temperature at the exit of the gasifier, quantity of oxidant, steam fed to gasifier and gasifier type, concentration of CO, $H_2$, $CO_2$, and $H_2O$ in the exhaust of the gasifier varies. For a more efficient gasifier, less oxidant is needed and for a given quantity of the biomass, quantity of either $H_2$, CO or both is higher in the stream exiting the gasifier. In other words, the calorific value of the exiting stream is increased as the efficiency of the gasifier is increased. The ratio of $H_2$ to CO in the exhaust stream of a conventional stream is much less than the desired ratio of about two; this ratio is often one or lower than one. The current efficiency of a biomass gasifier is about 50%, and in the future it is expected to increase to about 70% or higher with the technical advancements.

As used herein, gasifier type or "mode of operation" includes the operation of the gasifier in at least one of the following ways: (1) fixed bed or moving bed, wherein biomass flows counter-current to the steam and oxidant; (2) fluidized bed gasifiers, wherein biomass, steam and oxidant are well-mixed, leading to uniform temperature in gasifier; and (3) entrained bed gasifier wherein biomass and reactants move co-currently through the reactor.

The gases exiting the gasifier are generally quenched from very high temperatures to a temperature that is easy to handle in post-gasifier processing. Gases can exit a gasifier at temperatures in the range of about 500° C. to 1500° C. After quenching, thermal energy is recovered from the gas stream. This stream is subsequently cleaned for particulate material and pollutants such as nitrogen and sulfur containing compounds. In one possible embodiment, this stream can be sent through a water-gas-shift (WGS) reactor to increase the $H_2$/CO ratio to about 2. In this step, for every $H_2$ molecule formed, a molecule of $CO_2$ is formed. Since liquid hydrocarbon fuel is formed through the reaction of $H_2$ and CO, every molecule of $CO_2$ formed in the WGS reactor contributes to lower production of liquid hydrocarbons.

All the processing steps including the biomass gasifier and the post gasifier operations, such as thermal energy recovery, pollutants removal and WGS reactor, constitute gasifying step for the biomass. The objective of the biomass gasifying step is to provide a syngas containing CO and $H_2$ that is ready to be fed to the liquid hydrocarbon conversion reactor with minimal post processing. One post processing procedure that may be used is the separation of some $CO_2$ from the syngas obtained from the gasifying step prior to feeding it into hydrocarbon conversion reactor. Similarly, it is not necessary to use all the unit operations described here in the gasifying step. For example, a WGS reactor may not be used to further adjust the $H_2$/CO ratio from the gasifier. Similarly, new unit operations when needed can be added to the gasifying step to provide a syngas that can be then fed to the liquid hydrocarbon conversion reactor. As is shown below, in one embodiment of the invention, a reverse WGS reactor is used in place of WGS reactor during the gasifying step.

Figure 2:
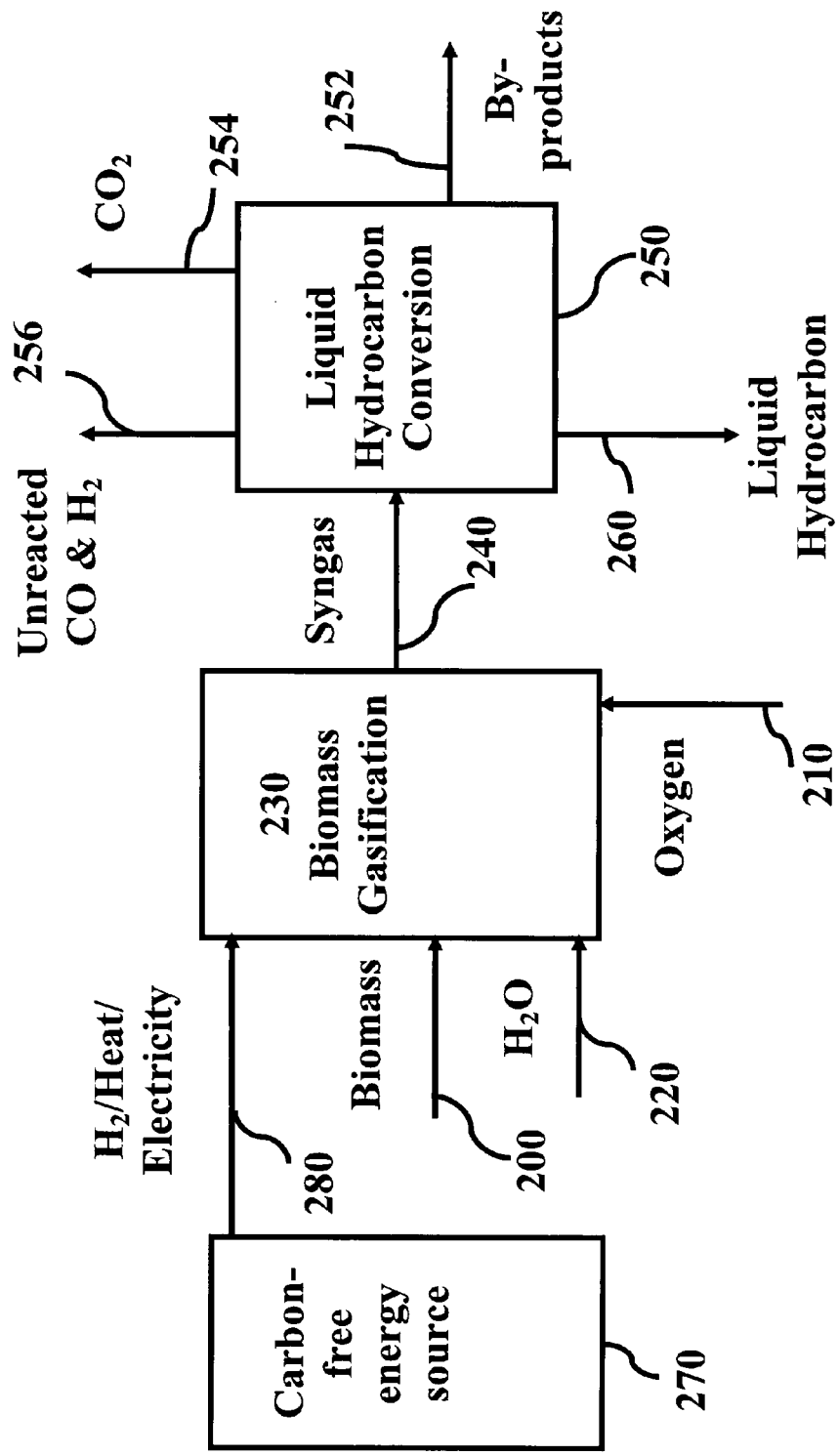
FIG. 2 is a general schematic diagram of liquid hydrocarbon synthesis using carbon-free energy source ($H_2CAR$ process) in accordance with one example of the present invention.

A schematic of the process of the present disclosure is illustrated in FIG. 2. Biomass in stream 200 is fed for biomass gasification to unit 230. The biomass gasification unit 230 comprises of a gasifier in which biomass is initially charged. Preprocessing of biomass to prepare it as a feed for gasifier is not shown in FIG. 2, but is expected to be included in any operating plant using the teachings of this disclosure. Oxygen in stream 210 and steam in stream 220 are also supplied to the gasifier. The exhaust from the gasifier is further processed in the biomass gasification unit 230 as described earlier and constitutes the gasifying step. Syngas stream 240 is then sent to a liquid hydrocarbon conversion reactor system 250. Liquid hydrocarbons are obtained in stream 260. The unreacted CO and $H_2$ are shown in line 256. The $CO_2$ stream from the reactor is shown in line 254. In this case, $CO_2$ has been separated from the gaseous effluent stream of the liquid hydrocarbon conversion reactor. Other by-products from reactor system 250 are shown in line 252. According to the current invention, energy from a carbon-free energy source 270 is sent through line 280 to the biomass gasification unit 230. The energy in line 280 can be supplied as either $H_2$, heat or electricity or any combination thereof. The supply of this energy decreases $CO_2$ emission in line 254 and increases the yield of liquid hydrocarbons.

The liquid hydrocarbon conversion unit 250 comprises of a reactor operating at a suitable temperature, pressure in presence of a catalyst to promote the formation of desired liquid hydrocarbon molecules. Some examples of liquid hydrocarbons are methanol, ethanol, butanols, other higher alcohols, any alkanes, alkenes, aromatics, substituted aromatics beyond carbon number 5 and any combination of the above mentioned compounds. Clearly, the reactor operating conditions will depend on the hydrocarbon molecule(s) of choice. The net heat of reaction in this reactor will be exothermic. The reactor can be operated in fixed-bed, slurry phase or fluidized-bed mode.

A well-known example of a liquid hydrocarbon conversion reactor is a Fischer-Tropsch (FT) reactor. It operates in the temperature range of about 150° C. to 375° C. and pressures in the range of about 1 to 100 bar. For the purpose of this invention, the catalyst for the FT process can be a metal such as iron, cobalt, nickel, ruthenium, and any combinations thereof; a metal oxide of above metals and combination thereof; promoters like potassium at varying weight percent; support material like silica and alumina; and any combination of the components just noted. An FT reactor is illustrated herein as an example only. However, one with skill in the art would recognize that other reactors and chemistries associated therewith could also convert syngas to liquid hydrocarbon molecules such as methanol synthesis and syngas fermentation to ethanol etc. as described in Spath et al.

The effluent stream from the liquid hydrocarbon conversion reactor is then separated into gaseous and liquid portions. The liquid portion may be further separated and/or processed (hydrocracked) to provide the desired liquid hydrocarbons in stream 260 and other by-products in stream 252. $H_2$, which is currently derived from syngas stream for product hydrocracking reducing the quantity of liquid fuel production, can also be obtained from carbon-free energy sources further increasing the yield of liquid fuel production. The unreacted CO and $H_2$ are recovered from the gaseous portion in stream 256. Generally, stream 256 will be recycled to the liquid hydrocarbon conversion reactor.

The energy from the carbon-free energy source 270 can be used at multiple places in the Biomass gasification unit 230. The most preferred place is the biomass gasifier itself. The most preferred mode of energy supply is in the form of $H_2$. Since a biomass gasifier operates at temperatures in excess of about 500° C. and generally in excess of about 1000° C., the introduction of $H_2$ to the gasifier can be quite beneficial in adjusting $H_2$/CO ratio and decreasing the concentration of $CO_2$ in the gasifier effluent stream. The following reverse WGS reaction is endothermic.

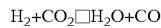

Therefore, the formation of $CO_2$ in presence of $H_2$ at high temperatures is readily reduced. This provides the higher concentration of desirable CO molecules. Furthermore, if sufficient quantity of $H_2$ is provided to the gasifier, $H_2$ will oxidize to water and the large heat of this reaction will be used for the gasification of the biomass to CO. This decreases the production of $CO_2$ and increases the subsequent yield of liquid hydrocarbons. The current efficiency of a biomass gasifier is about 50%, which implies that about 50% of the energy content of the biomass is lost due to inefficiencies. The supply of this lost energy through $H_2$ rather than biomass will increase the calorific value of the stream exiting the gasifier. Without wishing to be tied to any particular theory, this explains why $H_2$ feed to the gasifier is beneficial. We have named process of the current invention and all the following configurations "hybrid hydrogen-carbon" ($H_2$CAR) process.

Another potential benefit of $H_2$ feed to the gasifier is that it can also impact the combustion characteristics of biomass. Specifically, addition of $H_2$ can potentially improve the combustion and gasification characteristics of the biomass by providing energy from an external source $H_2$ rather than biomass. This could ensure significant decrease in the formation of tars in the gasifier. Also, location of $H_2$ and biomass feed in the gasifier can affect combustion characteristics of biomass and tar formation. Recycle of $CH_4$ and $C_{30+}$ molecules to the gasifier from the FT reactor can also achieve these goals.

High temperature heat in line 280 can also be used to supply energy for gasification in the gasifier. This heat can be supplied directly from a nuclear reactor or solar concentrators. If electricity is available in line 280, it can be converted to heat by using resistive heat or by other means such as plasma etc. By supplying the energy for gasification through a carbon-free energy source, the yield of liquid hydrocarbons will increase. This will also decrease the amount of $CO_2$ in line 254. In this mode of operation, demand for oxygen in line 210 is also expected to decrease.

In the process of the present disclosure, it is also possible to use the energy in line 280 to dry the biomass. As stated earlier, the biomass from the ecosystem of planet earth has significant quantities of water. It requires combustion of 10% to 20% of biomass to dry the remainder of biomass. This contributes to a lower yield of liquid hydrocarbons. Heat from the sun or a nuclear reactor can be directly used to dry the biomass. Also, heat could be produced from electricity in line 280 to dry the biomass. In a preferred mode, $H_2$ is combusted to supply heat energy to dry the biomass.

Figure 3:
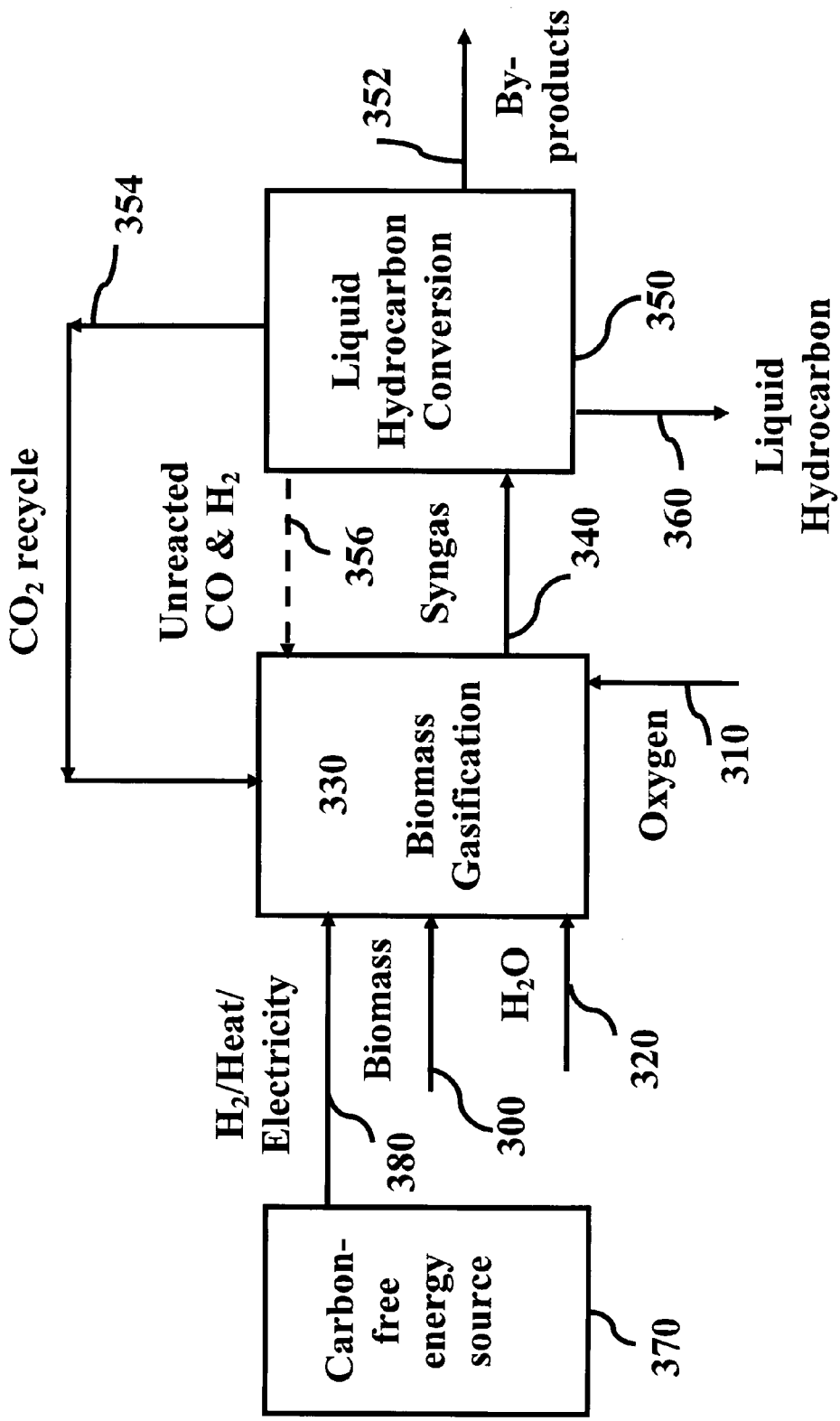
FIG. 3 is a schematic diagram of the liquid hydrocarbon synthesis using carbon-free energy source and $CO_2$ recycle in accordance with one example of the present invention.

Another process according to the present disclosure is shown in FIG. 3. The common units and streams from FIG. 2 have the same last two digits. Generally, some $CO_2$ is produced in the gasification process and also co-formed in the liquid hydrocarbon conversion reactor due to water gas shift reaction. The formation of this $CO_2$ represents product loss. The present teachings increase the liquid hydrocarbon yield by recycling $CO_2$ in line 354, containing $CO_2$ formed from the gasification and liquid hydrocarbon conversion reactor, to the biomass gasification unit 330. This $CO_2$ can be recycled to the same location in the biomass gasification unit as $H_2$ in line 380. Even though it is preferred that both $CO_2$ in line 354 and $H_2$ feed in line 380 be fed to the same location in unit 330, it is not essential to do so. Instead, each could be fed to a suitable location of its own. When $CO_2$ is recycled and $H_2$ is supplied in sufficient quantities in line 380, the reverse WGS reaction ensures that there is no significant $CO_2$ built-up in the process of FIG. 3. However, a small amount of purge from the process in FIG. 3 may be taken to remove build-up of other components. In such a purge case, some $CO_2$ may be vented through the purge stream from the process. If both $CO_2$ and $H_2$ are recycled to the gasifier, it will be possible to operate such that the effluent stream from the gasifier will have the desired $H_2$/CO ratio. While the desired ratio can be any suitable number, generally the preferred number will be greater than one but less than three and most preferably this number will be in the neighborhood of two. If in this process of FIG. 2 or 3, $CO_2$ is separated from the syngas stream prior to feeding it to unit 350, then this $CO_2$ stream is recycled in a manner analogous to the one described for stream 354. The recycled $CO_2$ stream for both FIGS. 2 and 3 need not be very pure. It can contain light hydrocarbons formed in the process, unreacted CO and/or $H_2$.

While the unreacted CO and $H_2$ stream 356 should be directly recycled to the liquid hydrocarbon conversion reactor in unit 350, the process of the present teachings provides flexibility to recycle it to the biomass gasification unit 330. This recycle location is analogous to those for the $H_2$ and/or $CO_2$.

Figure 4:
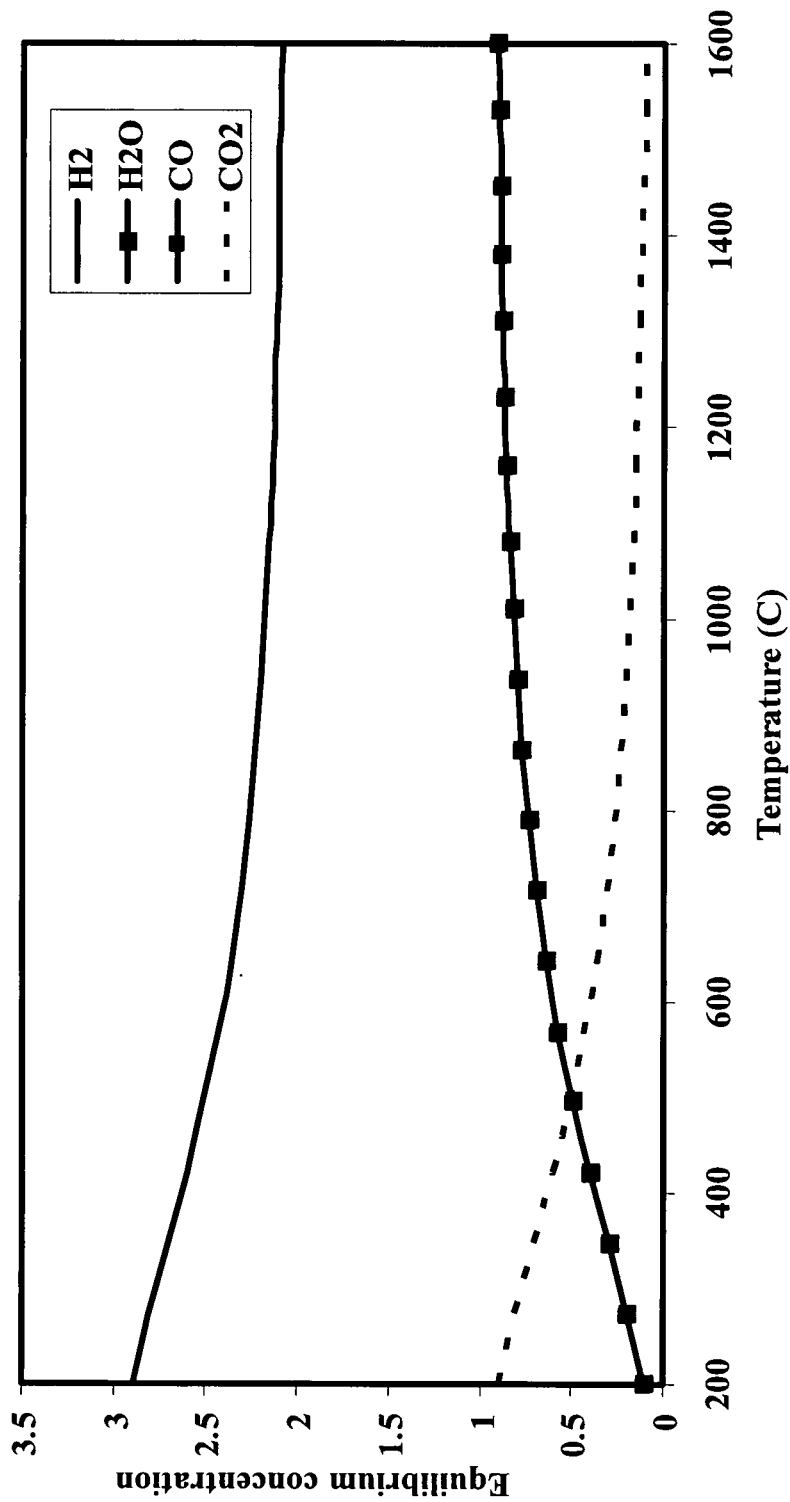
FIG. 4 is a reverse Water Gas Shift Equilibrium graph.

The suitable location in the biomass gasification unit (230 or 330) for feeding $H_2$ in line 380 (or 280 in FIG. 2) and $CO_2$ recycle stream will now be illustrated through simple calculations. For this purpose, 3 kmoles of $H_2$ and 1 kmole of $CO_2$ were mixed together and allowed to equilibrate at different temperatures. The thermodynamic equilibrium concentration of $H_2$, CO, $CO_2$ and $H_2O$ as a function of temperature is shown in FIG. 4. It is worth pointing out that due to the composition of initial mixture, the concentration of CO and $H_2O$ are the same. This is because each molecule of $H_2$ reacting with $CO_2$ forms a molecule of CO and a molecule of $H_2O$. From FIG. 4 we observe that at temperatures greater than about 350° C., more than about 25% of the $CO_2$ is converted to CO. More specifically, at temperatures greater than about 500° C., more than half of $CO_2$ is converted to desirable CO. Therefore, the recycle $CO_2$ stream and $H_2$ from the carbon-free energy source should be fed at a temperature higher than about 350° C., preferably higher than about 400° C. and most preferably higher than about 500° C. It will generally be desirable to feed these streams at the highest possible temperature. Therefore, they preferably should be fed within the biomass gasification unit 230 or 330. Either or both streams can be fed at the inlet of the gasifier, or at an intermediate point in the gasifier, or near the exit or at the exit of the gasifier. When fed at the inlet of the gasifier, irrespective of the gasifier inlet temperature, the streams become exposed to the desired high temperatures in the gasifier and result in higher carbon efficiency due to the process of these teachings.

Figure 5:
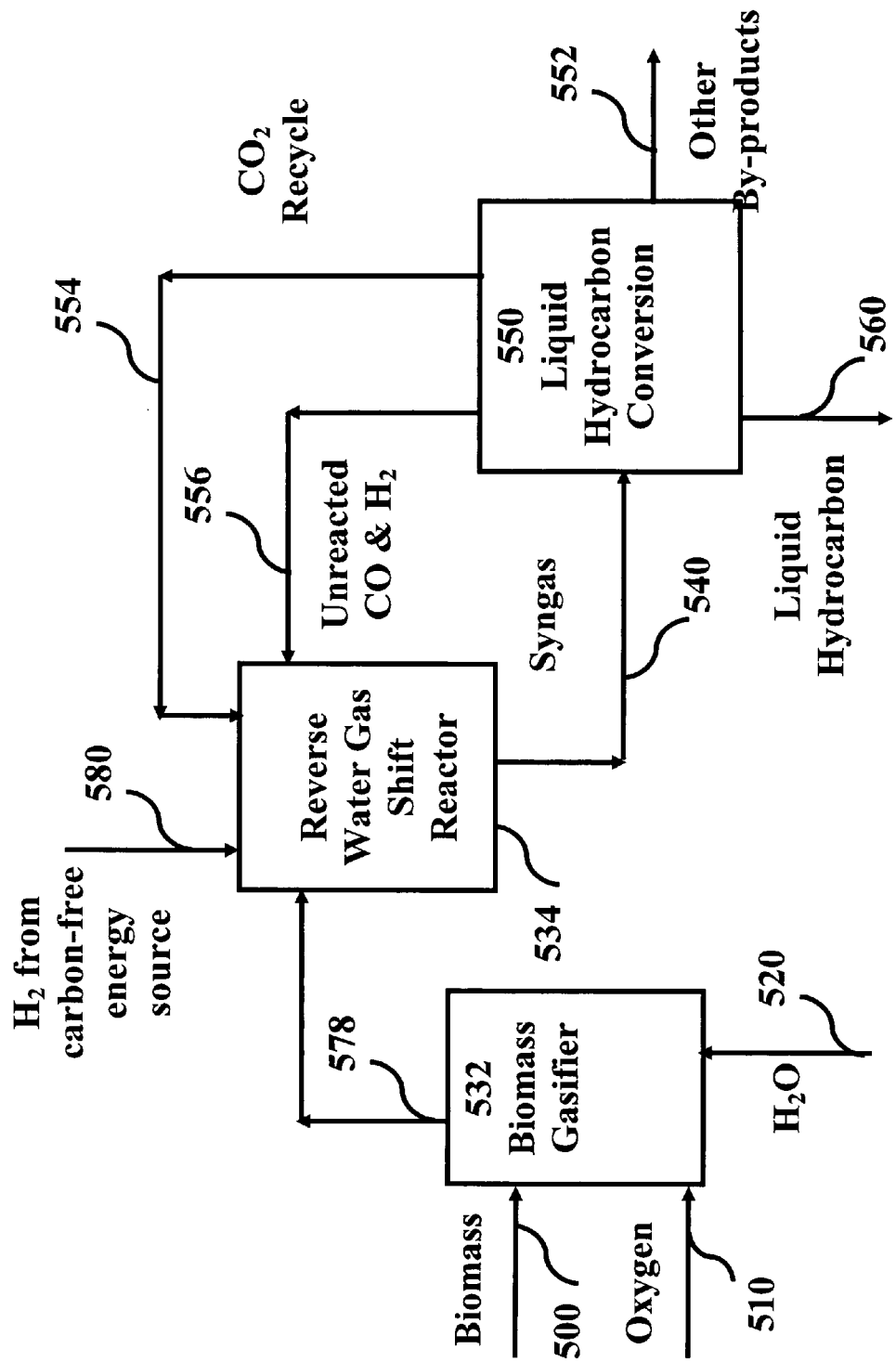
FIG. 5 is a schematic diagram of the liquid hydrocarbon synthesis wherein a reverse water gas shift reactor is used in accordance with one example of the present invention.

When effluent gas stream exits the gasifier at a temperature greater than about 350° C. and preferably greater than about 400° C. and most preferably greater than about 500° C., the recycle $CO_2$ stream and $H_2$ from the carbon-free energy can be mixed with the effluent gas stream at any point in the processing steps before its temperature drops below the desired temperature range. One such example where the biomass gasification unit of FIGS. 2 and 3 is broken in two processing steps is shown in FIG. 5. Here, stream 578 exits the biomass gasifier 532 at a desired high temperature. This stream 578 is eventually fed to a reverse WGS reactor 534 operating at a temperature greater than about 350° C. and preferably greater than about 400° C. and most preferably greater than about 500° C. Any suitable high temperature WGS catalyst can be used in the reactor. One known example is an iron-based catalyst, although other catalysts are suitable. For example, Nickel based catalysts may also be suitable for this purpose. If the temperature of stream 578 is sufficiently high when $H_2$ in stream 580 is mixed with the $CO_2$ recycle stream 554 then one may not even need catalyst for the reverse WGS reaction. At high temperatures greater than about 700° C., the kinetic barrier for the reaction may be easily overcome, resulting in acceptable conversion to CO through reverse WGS reaction. The higher the temperature of stream 580 at the mixing point, the more profound this effect will be. The objective is to exploit the high temperatures available for the reverse WGS reaction. Utilization of this high temperature heat for the endothermic reverse WGS reaction has a potential to improve process thermal efficiency.

In the process of FIG. 5, unreacted CO and $H_2$ in stream 556 is also shown to be fed to the reverse WGS reactor 534. This is optional. The gaseous stream 556 can instead be directly recycled to the liquid hydrocarbon conversion reactor 550.

In a preferred mode, the gaseous portion from the liquid hydrocarbon conversion reactor effluent stream may not be separated into a $CO_2$ stream and unreacted CO and $H_2$ stream. Instead, they are collected as a combined stream and recycled to the biomass gasification units of FIGS. 2, 3 and 5 in a manner analogous to the one described for $CO_2$ recycle. This will reduce the processing steps associated with the further separation of $CO_2$ from the gaseous portion of effluent stream exiting the liquid hydrocarbon conversion reactor.

In FIG. 5, the biomass gasifier 532 and the reverse WGS reactor 534 constitute the biomass gasification unit 230 or 330 shown in FIGS. 2 and 3. In another embodiment, it is possible for the stream 578 to be processed in other unit operations prior to feeding it to the reverse WGS reactor. Thus, this stream could go through any of the steps of quenching, pollutants removal, thermal heat recovery, etc. Similarly, syngas stream 540 exiting the reverse WGS reactor can optionally go through a number of the unit operations prior to feeding it to unit 550.

The advantage of feeding the $H_2$ from carbon-free energy source and recycle $CO_2$ at a high temperature in the biomass gasifying step is that it decouples the reverse WGS reaction requirement from the catalyst in liquid hydrocarbon conversion reactor. Generally, the liquid hydrocarbon conversion reactors operate at temperatures below 350° C., and at these lower temperatures, reverse WGS reaction is not favorable. The processes of these teachings utilize the advantage of the preferable temperature range to run the reverse WGS reaction and thus minimize the loss of carbon in the biomass as $CO_2$. This allows a degree of freedom to tailor the catalyst specifically for the desired liquid hydrocarbon molecule. Another advantage of feeding $H_2$ from a carbon-free energy source and recycle $CO_2$ at a higher temperature as in the gasifier is that kinetic rate barriers are negligible and one readily approaches thermodynamic equilibrium. This minimizes $CO_2$ formation in the gasifier and further help in reducing all the downstream apparatus size and equipment such as size of recycle compressors and piping.

When in the process of FIGS. 2, 3 and 5, the synthesis gas is fed to a FT reactor; a distribution of products is obtained. The products formed will be a mixture of molecules from methane to C100, alkenes from C2 to C20, any alcohols, any substituted molecules formed from these compounds. Depending on the operating conditions of the FT process, a separation scheme can be devised wherein the catalyst is separated from the product mixture and is recycled to the FT reactor. Smaller molecules can be flared to generate power or they can be recycled to the gasifier. Unreacted CO and $H_2$ as well as $CO_2$ formed in the gasifier and FT reactor can be recycled to the gasifier.

Figure 6:
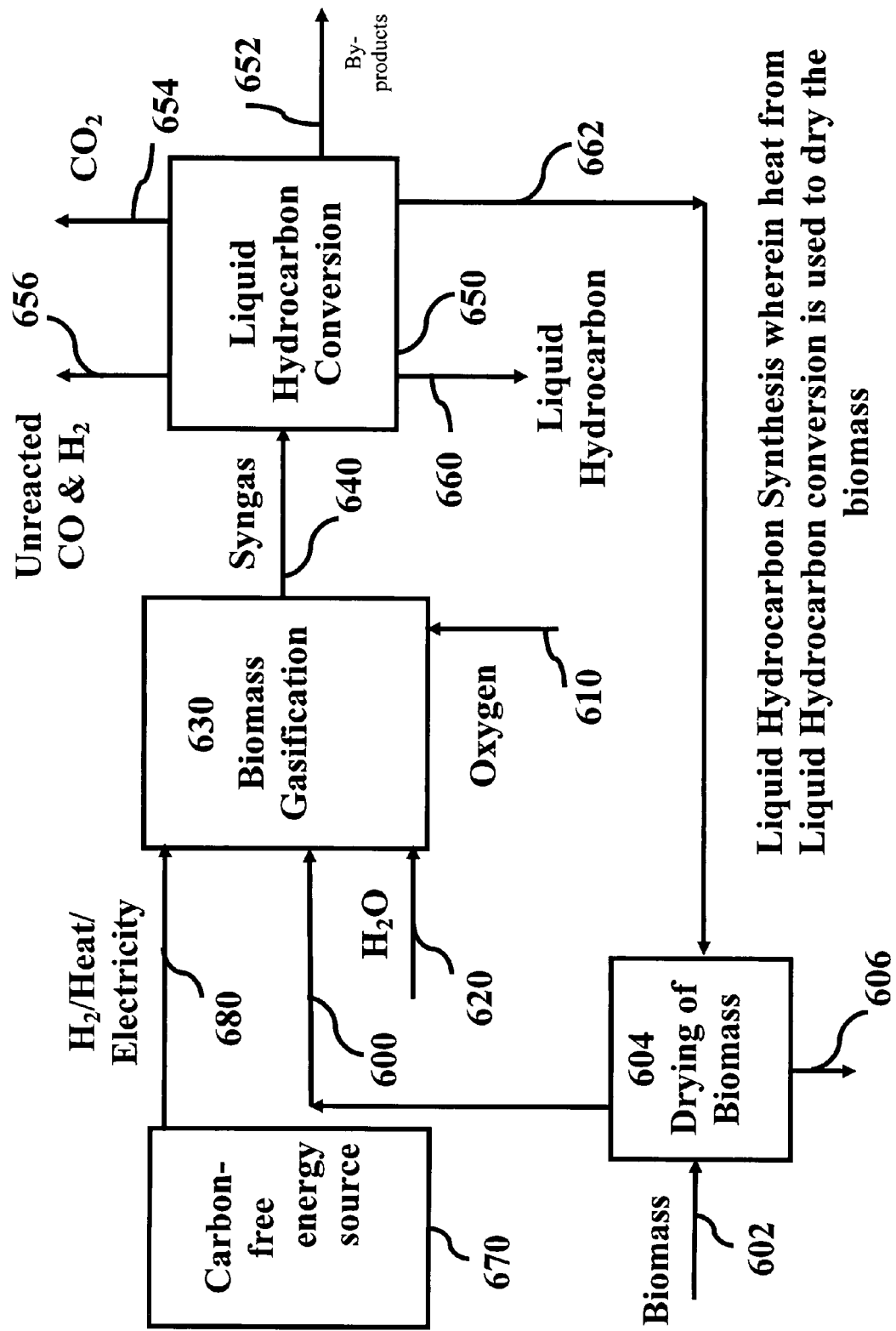
FIG. 6 is a schematic diagram of liquid hydrocarbon synthesis wherein heat from liquid hydrocarbon conversion reactor is used to dry the biomass using carbon-free energy source in accordance with one example of the present invention.

Another aspect of these teachings is shown in FIG. 6. As stated earlier, biomass contains significant amounts of water that must be removed during the processing steps. The heat required for this purpose can be equivalent to the heat content of about 10 to 20% of the biomass fed. On the other hand, reaction of CO and $H_2$ in the liquid hydrocarbon conversion reactor generates significant quantities of heat at the reactor temperatures. Generally, the temperature is greater than about 150° C. Thus, a portion of the heat from the liquid hydrocarbon conversion reactor shown as line 662 can be used to dry the wet biomass 602 in drying unit 604. The dried biomass is fed in line 600 for the biomass gasifying step. The water laden stream exits in line 606. The utilization of this low level heat from the liquid hydrocarbon conversion will improve the energy efficiency of the process.

Figure 7:
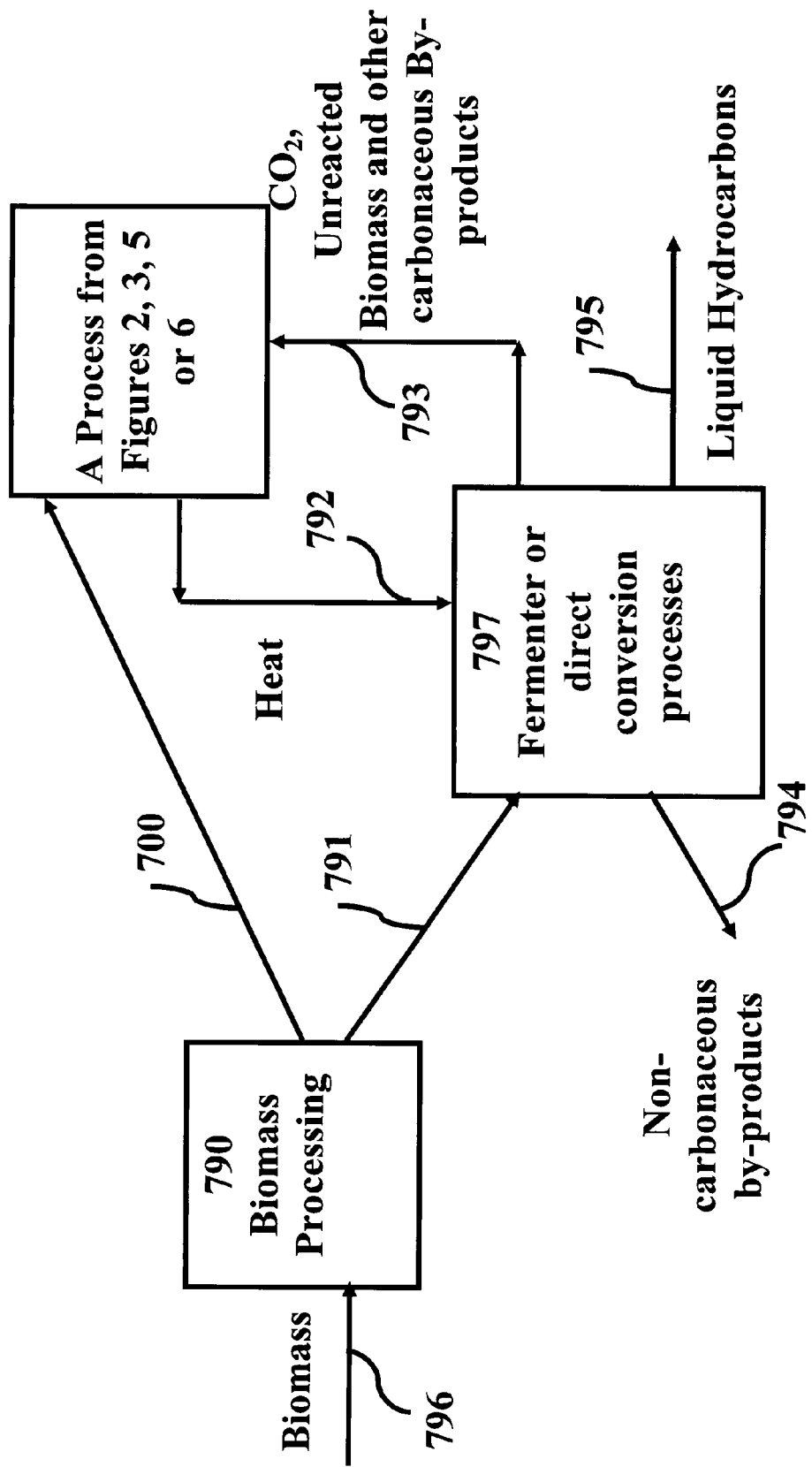
FIG. 7 is a schematic diagram of liquid hydrocarbon synthesis wherein carbonaceous by-products and $CO_2$ from a fermenter are fed to gasifier and heat from $H_2CAR$ process is used to supply process heat for the fermentation process in accordance with one example of the present invention.

Sometimes a biomass feed has components that are easily processable to liquid hydrocarbons by using micro-organisms. Examples include fermentation of different sugars, xylose, etc., to methanol, ethanol or butanols, etc. Such sugars can be obtained from corn kernels, sugar cane etc. However, these crops also contain cellulosic and other forms of biomass that are not easily processed by micro-organisms. Corn stover etc. is examples of such a biomass. Harvest Index of corn is about 0.5 implying that nearly similar quantities of corn kernels are obtained as corn stover and this is true for most other crops. The teachings of these processes can be easily applied to such a situation to increase the overall yield of liquid hydrocarbons. FIG. 7 shows such a process. In the biomass processing unit 790, the biomass 796 is broken into two streams. The biomass in 791 contains that portion of the original biomass in stream 796 that can be directly converted to liquid hydrocarbons by micro-organisms (e.g.: sugary fraction) in unit 797. Fermentation is an example of such a direct conversion process. Another portion of the biomass from unit 790 that is difficult to handle in unit 797 (e.g.: lignocellulosic fraction) is sent through line 700 to $H_2CAR$ process (described in FIG. 2, 3, 5 or 6). An aspect of these teachings is that any $CO_2$ co-produced from direct conversion unit 797 containing micro-organisms can also be fed through stream 793 to the $H_2CAR$ process. The $CO_2$ in stream 793 can be treated analogous to the recycle $CO_2$ of these teachings. The product formation during ethanol production nearly follows one-third rule where about ⅓ of corn grain is converted to ethanol, about ⅓ to $CO_2$ and about ⅓ to dried distillers grains with solubles (DDGS) on mass basis. So, any unreacted biomass or other carbonaceous by products (e.g. DDGS) from the unit 797 can be fed to the gasifier of the processes shown in FIG. 2, 3, 5 or 6. Also, left over biomass (e.g. corn stover for corn) during harvesting can be fed to the $H_2CAR$ process. This will improve the recovery of carbon atoms and increase the overall yield of liquid hydrocarbons.

In FIG. 7, stream 793 contains $CO_2$, unreacted biomass and carbonaceous by-products for convenience only. In reality, they will be fed separately. The process in FIG. 7 also allows the co-production of liquid hydrocarbons using micro-organisms. Moreover, high-level heat from the gasifier and gas to liquid conversion reactor in the $H_2CAR$ process can be used for the digestion of lignocellulosic mass and separation of alcohol from the fermenter effluent. Low-level heat from the $H_2CAR$ process can be used to dry the biomass prior to gasification. Yet another possibility is to use any excess high level heat from the gasifier after supplying process heat for the fermentation process to co-produce electricity. Possibility exists to supply process heat for the fermentation process with heat from carbon-free energy sources such nuclear reactors or concentrated solar thermal. Currently energy balance of corn ethanol is about 1.25 implying that 100 J of fossil fuel is burned to obtain about 125 J of ethanol. Heat integration options suggested here can improve the energy balance of corn ethanol from about 1.25 to 3 or more.

Gasifiers referred during the description of the $H_2CAR$ process are directly heated where heat needed for the endothermic gasification process is supplied by in-situ combustion of a fraction of the feedstock. Another possibility exists of using indirectly heated gasifier where circulation of sand, heat transfer through the walls or hot gas recirculation provides the heat for gasification process. Currently energy required for heating sand, wall or gas is mostly generated by combustion of char formed during the gasification process but possibility exists of utilizing heat directly from carbon-free energy sources such as nuclear reactor or solar-thermal.

Another aspect which will significantly help to decrease the overall cost of the process is the fact that co-produced oxygen, when $H_2$ from water using carbon-free energy source is produced, can be used in the gasification unit. Air Separation Units (ASU) accounts for about 12% of total capital cost of a coal to liquid complex. It is expected that the capital cost of ASU will be of the same order for a biomass to liquid complex. Eliminating ASU's will help reduce the cost of the overall complex. Moreover, additional energy used in the ASU will be saved.

During the description of the process of these teachings, $H_2$ and recycle $CO_2$ streams are fed to a suitable high temperature location in the biomass gasifying step. Even though not mentioned explicitly, it should be understood that the prudent practice of preheating such streams against other suitable process streams prior to feeding it at the high temperature may be followed. Use of heat exchanger network with proper pinch diagrams is desirable. Such heat exchange practice will improve the overall efficiency of the process.

Another aspect of these teachings is that carbon-containing municipal waste and some coal can also be co-fed to a properly designed gasifier. Thus, organic waste materials from various sources can be converted to useful liquid hydrocarbons. This will not only help with the handling of waste material but also in the carbon management of the environment. Also, along with biomass, other coal derived or coal like materials such as peat, lignite, pet coke, sub-bituminous, bituminous, anthracite etc can also be co-fed to the gasifier. Other carbon sources such as methane, naphtha can also be co-fed along with the biomass.

The teachings of this invention can also solve the intermittency problems associated with carbon-free energy sources such as solar and wind. This process can be thought of as hydrogenation process to store carbon-free $H_2$ on the carbon moieties of the liquid fuel during the availability of carbon-free energy and later when these carbon-free energy sources are unavailable, dehydrogenation via reforming can be carried out to obtain electricity/$H_2$ as per the need. $CO_2$ co-produced can be stored until carbon-free energy sources are available when $CO_2$ can be converted back to liquid fuel using $H_2CAR$ process.

In yet another option, instead of co-feeding pet coke, methane, naphtha, coal or municipal waste, these carbon-moieties or their combination in any proportion can be solely used for gasification instead of biomass and all the teachings will again apply for such a situation. In such a case, when coal, methane, naphtha or pet coke is gasified using the process of current invention; the amount of co-produced $CO_2$ from the overall process is minimal and this eliminates the need for $CO_2$ sequestration from the conversion of these carbon sources to liquid fuel.

Syngas fermentation has been reported in the literature to produce ethanol from biomass via gasification. Clostridium ljungdahlii is used to convert either CO or $CO_2+H_2$ obtained from gasification of any carbon source such as biomass, coal, coke etc. to ethanol although CO is preferred substrate as compared to $CO_2+H_2$ for micro-organisms. All the configurations mentioned in this disclosure can be easily applied to syngas fermentation, increasing the over-all yield of the process by nearly a factor of about 3 using $H_2$ from a carbon-free energy source. The carbon-free $H_2$ can be fed to the gasifier as well as syngas fermenter and $CO_2$ from the process can be recycled to the gasifier and/or syngas fermenter. So, the liquid hydrocarbon conversion reactor described earlier in this disclosure can be syngas fermenter instead of FT process and rest of the details will be the same except for the separation of ethanol from water via distillation.

Even though in this disclosure we focused on production of liquid fuel, chemicals synthesis is equally possible using the teachings of this invention. Methane, ethylene, methanol, dimethyl ether and a whole range of chemicals can be produced using biomass/coal and carbon-free energy.

These teachings provide a much needed feasible sustainable pathway to supply high energy density liquid hydrocarbon fuel for the transportation sector. By using energy from a carbon-free energy source and judiciously combining it with biomass gasification, the yield of liquid hydrocarbon fuels is increased. The teachings described above provide novel ways of combining energy from a carbon-free energy source with a biomass gasification process. Specifically, when a carbon-free energy source is recovered as $H_2$, the novel manner in which $H_2$ is used in the gasifying step of the biomass leads to desirable ratios of $H_2$ to CO for the subsequent processing in liquid hydrocarbon reactor. When this $H_2$ is fed to the gasifier, it suppresses the formation of $CO_2$ and increases yield of liquid hydrocarbon products per pass.

Another novel feature of these teachings is the recycle of $CO_2$ from the liquid hydrocarbon conversion unit to the biomass gasification unit. Specifically, when this is done in conjunction with $H_2$ from a carbon-free energy source, one establishes a relatively low steady-state $CO_2$ concentration levels at various points in the plant. This allows nearly complete recovery of carbon contained in the biomass to liquid hydrocarbons. The only carbon lost in the processing step will be through any purge stream or in an intentional byproduct stream. Such high recoveries of carbon significantly reduce the $CO_2$ emission to atmosphere from such a processing plant. As a result, the land area requirement to produce a given quantity of liquid hydrocarbon fuel is significantly reduced. A model calculation example illustrates the benefits.

The significance of the invention can be realized by the comparison of the land area requirement for the current as well as proposed processes.

Example 1

For this purpose, the numbers for the amount of syngas production from biomass gasification provided in the recent National Research Council's report on $H_2$ were used. The efficiency of the gasifier using current technologies is 50%. The report uses a biomass having growth rate of 10 tons/hectare/yr and Higher Heating Value (HHV) of 8000 BTU/lb. Conversion of syngas to the desired liquid hydrocarbon at 100% efficiency is assumed and the desired liquid hydrocarbon is diesel, represented as $C_{15}H_{32}$. Gasifier exhaust is assumed at thermodynamic equilibrium and $CO_2$ exiting the gasifier and FT reactor is recycled to the gasifier. Hydrogen from a carbon-free energy source is used to convert all the carbon to the desired diesel molecule. In the report, 15% of the biomass is combusted to dry the remainder of the biomass.

Using conventional processes for the production of 13.84 million barrels per day which is the current consumption rate of oil of the U.S. transportation sector will require 5.3 billion ton of biomass per year. 1.7 GtC/yr as $CO_2$ will be produced during this conversion process and the land area requirement is estimated to be about 5,296,000 square km. This required land area is 58% of the total U.S. land area. To put the numbers in perspective, the currently used cropland area in the U.S. is 1,395,000 square km which is roughly 20% of U.S. land area.

Using the present invention to produce the same quantity of liquid fuel will require 1.4 billion tons of biomass per year, when heat from the liquid hydrocarbon conversion reactor is used to dry the biomass. Alternatively, the same amount of biomass will be required if heat from combustion of $H_2$ is used to dry the biomass. No $CO_2$ is released during the conversion process and the land area requirement is estimated to be about 1.4 million square km. This required land area is 15.4% of the total U.S. land area. $H_2$ requirement for the present invention is 240.1 billion kg/yr. If this quantity of $H_2$ is produced using solar energy at an efficiency of 10%, the land area requirement will 53,993 square km, which is 0.6% of total U.S. land area.

Example 2

The significance of the invention can be realized by the amount of coal required for the current as well as proposed processes. For this purpose, the numbers for the amount of syngas production from coal gasification provided in the recent National Research Council's report on $H_2$ were used. The efficiency of the gasifier using current technologies is 75% and Higher Heating Value (HHV) of 12000 BTU/lb. Conversion of syngas to the desired liquid hydrocarbon at 100% efficiency is assumed and the desired liquid hydrocarbon is diesel, represented as $C_{15}H_{32}$. Gasifier exhaust is assumed at thermodynamic equilibrium and $CO_2$ exiting the gasifier and FT reactor is recycled to the gasifier. Hydrogen from a carbon-free energy source is used to convert all the carbon to the desired diesel molecule.

Using conventional processes for the production of 13.84 million barrels per day, which is the current consumption rate of oil for the U.S. transportation sector, will require about 2 billion ton of coal per year. During the conversion of coal to liquids, 0.9 GtC/yr in the form of $CO_2$ will be released to the atmosphere. To give a comparison, the current US transportation sector releases 0.5 GtC/year[25] and the current global release of carbon from all the fossil fuel usage is estimated to be at 7 GtC/year. Assuming total reserves of recoverable coal in US to be around 275 billion tons, coal will last for 89 years after taking into account current consumption rate of 1.1 billion tons coal/yr.

Using the present invention to produce the same quantity of liquid fuel will require 0.8 billion tons of coal per year. No $CO_2$ is released during the conversion process for the present invention and coal will last for 144 years. $H_2$ requirement for the present invention is 211 billion kg/yr. If this quantity of $H_2$ is produced using solar energy at an efficiency of 10%, the land area requirement will 47,555 square km, which is 0.5% of total U.S. land area.

The following documents are incorporated herein by reference in their entirety:
1. Hoffert, M. I. et al. Energy implications of future stabilization of atmospheric CO2 content. Nature 395, 881-884 (1998).
2. Nathan S Lewis, D. G. N. Powering the planet: chemical challenges in solar energy utilization. (2006).
3. Agrawal, R., Offutt, M. & Ramage, M. P. Hydrogen economy—An opportunity for chemical engineers? AIChE Journal 51, 1582-1589 (2005).
4. MacLean, H. L. & Lave, L. B. Evaluating automobile fuel/propulsion system technologies. Progress in Energy and Combustion Science 29, 1-69 (2003).
5. Schlapbach, L. & Zuttel, A. Hydrogen-storage materials for mobile applications. Nature 414, 353-358 (2001).
6. The NRC report. The Hydrogen Economy-Opportunities, Costs, Barriers, and R&D Needs 2004 (The National Academies Press, Washington D.C.).

7. Bossel, U., Eliasson, B. & Taylor, G. The Future of the Hydrogen Economy: Bright or Bleak? Available online at http://www.efcf.com/e/reports/E08.pdf. European Fuel Cell Forum, 26 Feb. 2005.
8. Tarascon, J. M. & Armand, M. Issues and challenges facing rechargeable lithium batteries. Nature 414, 359-367 (2001).
9. American Energy Security: Building a bridge to energy independence and to a sustainable energy future. The Southern States Energy Board Norcross, Ga. (July 2006).
10. Hill, J., Nelson, E., Tilman, D., Polasky, S. & Tiffany, D. From the Cover: Environmental, economic, and energetic costs and benefits of biodiesel and ethanol biofuels. PNAS 103, 11206-11210 (2006).
11. A P Steynberg & Dry, M. E. (eds.) Fischer Tropsch Technology (Elsevier, 2004).
12. Oyvind Vessia, P. F., Oyvind Skreiberg. Biofuels from lignocellulosic material—In the Norwegian context 2010-Technology, Potential and Costs. (20 Dec. 2005).
13. U.S. Department of Energy. Just the basics Diesel Engine Freedom CAR & Vehicle Technologies Program. http://www1.eere.energy.gov/vehiclesandfuels/pdfs/basics/jtb_diesel_engine.pdf (August 2003).
14. Riedel, T. et al. Comparative study of Fischer-Tropsch synthesis with H2/CO and H2/CO2 syngas using Fe- and Co-based catalysts. Applied Catalysis A: General 186, 201-213 (1999).
15. The NRC report. The Hydrogen Economy-Opportunities, Costs, Barriers, and R&D Needs. (2004).
16. Bridgwater, A. V. Renewable fuels and chemicals by thermal processing of biomass. Chemical Engineering Journal 91, 87-102 (2003).
17. Li, X., Grace, J. R., Watkinson, A. P., Lim, C. J. & Ergudenler, A. Equilibrium modeling of gasification: a free energy minimization approach and its application to a circulating fluidized bed coal gasifier. Fuel 80, 195-207 (2001).
18. Yuehong, Z., Hao, W. & Zhihong, X. Conceptual design and simulation study of a co-gasification technology. Energy Conversion and Management 47, 1416-1428 (2006).
19. A P Steynberg, M. E. D. (ed.) Fischer Tropsch Technology (Elsevier, 2004).
20. Spath, P. L. & Dayton, D. C. Preliminary Screening—Technical and Economic Assessment of Synthesis Gas to Fuels and Chemicals with Emphasis on the Potential for Biomass-Derived Syngas. Report No. NREL/TP-510-34929; National Renewable Energy Laboratory, Golden, Colo., http://www1.eere.energy.gov/biomass/pdfs/34929.pdf (2003).
21. Agrawal, R., Singh, N. R., Ribeiro, F. H. & Delgass, W. N. Sustainable fuel for the transportation sector. PNAS 104, 4828-4833 (2007).
22. Graham, R. L., Nelson, R., Sheehan, J., Perlack, R. D. & Wright, L. L. Current and Potential U.S. Corn Stover Supplies. Agron J 99, 1-11 (2007).
23. Rosentrater, K. A. Expanding the role of systems modeling: considering byproduct generation from biofuel production. Ecology and Society 11 (2005).
24. Farrell, A. E. et al. Ethanol Can Contribute to Energy and Environmental Goals. Science 311, 506-508 (2006).
25. U S Carbon Dioxide Emissions from Energy Sources 2005 Flash Estimate. (2006).
26. Pacala, S. & Socolow, R. Stabilization wedges: Solving the climate problem for the next 50 years with current technologies. Science 305, 968-972 (2004).
27. Verkerk, K. A. N., Jaeger, B., Finkeldei, C.-H. & Keim, W. Recent developments in isobutanol synthesis from synthesis gas. Applied Catalysis A: General 186, 407-431 (1999).

While an exemplary embodiment incorporating the principles of the present invention has been disclosed hereinabove, the present invention is not limited to the disclosed embodiment. Instead, this application is intended to cover any variations, uses, or adaptations of the inventions using its general principles. Further, this application is intended to cover such departures from the present disclosure as come within known or customary practice in the art to which this invention pertains and which fall within the limitations of the appended claims.

The invention claimed is:

1. A process for converting a carbon-containing moiety to a liquid hydrocarbon fuel, comprising:
   gasifying with a predetermined energy source at least a portion of the carbon-containing moiety to produce a syngas stream comprising carbon monoxide and hydrogen, wherein the carbon-containing moiety is selected from the group consisting of biomass, coal, pet coke, methane, naphtha, and combinations thereof, at least a portion of the predetermined energy source being from a carbon-free energy source;
   reacting the syngas stream to form liquid hydrocarbon fuel; wherein the syngas stream is reacted in a hydrocarbon conversion reactor system to form liquid hydrocarbon fuel and carbon dioxide, wherein the liquid hydrocarbon fuel is a material comprising carbon and hydrogen that can exist in a closed container at normal temperature and pressure of 20° C. and 1 atmospheric pressure in a liquid state, and wherein the carbon dioxide from the hydrocarbon conversion reactor system is recycled to the gasifier;
   wherein the gasifying comprises introducing hydrogen derived from a carbon-free energy source into a gasifier, wherein the carbon-free energy source is selected from the group consisting of solar, wind, hydro and nuclear energy, wherein hydrogen includes excess hydrogen in excess of the amount of hydrogen reacting with the carbon-containing moiety,
   dividing a given biomass into a first fraction that can be directly converted by micro organisms to a liquid hydrocarbon and a second fraction that is not readily converted by micro organisms to liquid hydrocarbons;
   feeding the first fraction to a direct conversion unit containing microorganisms and recovering a liquid hydrocarbon product stream, a $CO_2$ containing stream, and optionally an unreacted biomass stream;
   feeding the second fraction of the biomass to the gasifier, and
   reacting excess hydrogen with carbon dioxide to decrease the concentration of carbon dioxide.

2. The process of claim 1 wherein the liquid hydrocarbon fuel is selected from the group consisting of methanol, ethanol, long chain alcohols, alkanes, alkenes, aromatics, and substituted aromatics compounds thereof.

3. The process of claim 1 wherein the biomass comprises a plant or tree.

4. The process of claim 1 wherein the biomass is selected from the group consisting of switch grass, sugar cane, corn, wood, and any cellulosic mass.

5. The process of claim 1 wherein the coal is any suitable coal or coal-derived material.

6. The process of claim 1 wherein the coal is selected from the group consisting of peat, lignite, sub-bituminous, bituminous, anthracite, and combinations thereof.

7. The process of claim 1 wherein the syngas stream is reacted in a hydrocarbon conversion reactor system to form liquid hydrocarbon fuel and $CO_2$, and wherein energy from the carbon-free energy source is additionally supplied as heat to the gasifier.

8. The process of claim 7 wherein any $CO_2$ separated prior to the reacting is recycled to the gasifier.

9. The process of claim 7 wherein a low molecular weight hydrocarbon from the hydrocarbon conversion reactor system is recycled to the gasifier.

10. The process of claim 1 wherein the syngas stream is reacted in a hydrocarbon conversion reactor system to form liquid hydrocarbon fuel and $CO_2$, such that a processing temperature at a point in the gasifier at which the hydrogen is supplied is higher than about 350° C.

11. The process of claim 10 wherein any $CO_2$ separated prior to the reacting is recycled to the gasifier.

12. The process of claim 10 wherein a low molecular weight hydrocarbon from the hydrocarbon conversion reactor system is recycled to the gasifier.

13. The process of claim 1 wherein the syngas stream is reacted in a hydrocarbon conversion reactor system to form liquid hydrocarbon fuel and $CO_2$, and wherein the hydrogen derived from the carbon-free energy source is fed to a predetermined location in the gasifier.

14. The process of claim 13 wherein any $CO_2$ separated prior to the reacting is recycled to the predetermined location in the gasifier.

15. The process of claim 1 wherein any $CO_2$ collected prior to the reacting or generated by the reacting is fed to a predetermined location in the gasifier.

16. The process of claim 1 wherein the syngas stream is reacted in a hydrocarbon conversion reactor system to form liquid hydrocarbon fuel and $CO_2$, and wherein a combined gaseous stream containing $CO_2$ and unreacted CO and $H_2$ from the hydrocarbon conversion reactor system is recycled to a predetermined location in the gasifier.

17. The process of claim 1 wherein energy from the carbon-free energy source is used to dry the biomass prior to feeding the biomass to the gasifier.

18. The process of claim 1 wherein the syngas stream is reacted in a hydrocarbon conversion reactor system to form liquid hydrocarbon fuel and $CO_2$, and wherein reaction heat from the reacting is used to dry the biomass prior to feeding the biomass to the gasifier.

19. The process of claim 1 wherein the unreacted biomass stream from feeding the first fraction is fed to the gasifier.

20. The process of claim 1 wherein the $CO_2$ containing stream from feeding the first fraction is fed to the gasifier.

21. The process of claim 20 wherein a specific feed point in the gasifying is positioned in a suitable location in the gasifier.

22. The process of claim 1 wherein the syngas stream is reacted in a hydrocarbon conversion reactor system to form liquid hydrocarbon fuel and $CO_2$, and wherein heat available from one of the gasifying and the reacting is used to supply process heat for the direct conversion unit.

23. The process of claim 22 wherein the process heat is used in the fermentation.

24. The process of claim 22 wherein the process heat is used in separation of the liquid hydrocarbon.

25. The process of claim 1 wherein excess hydrogen includes an amount of hydrogen exceeding an about two to one ratio of hydrogen gas and carbon monoxide.

26. The process of claim 1 wherein the supply of the predetermined energy source including excess hydrogen is sufficient to reduce the concentration of carbon dioxide through the reverse water gas shift reaction.

27. The process of claim 26 wherein the reduction of carbon dioxide is sufficient to increase the yield of liquid hydrocarbon fuel.

28. The process of claim 26 wherein the excess hydrogen ensures that there is no significant carbon dioxide release from the process.

29. The process of claim 1 wherein reacting excess hydrogen with carbon dioxide decreases the amount of carbon dioxide.

\* \* \* \* \*